United States Patent
Wang et al.

(10) Patent No.: US 8,265,575 B2
(45) Date of Patent: Sep. 11, 2012

(54) METHODS FOR HANDLING A TRANSMITTING PROCESS AND COMMUNICATION APPARATUSES UTILIZING THE SAME

(75) Inventors: Chih-Yuan Wang, Hsinchu (TW); Den-Kai Juang, Taichung (TW); Mei-Hui Yang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 711 days.

(21) Appl. No.: 12/485,230

(22) Filed: Jun. 16, 2009

(65) Prior Publication Data

US 2010/0317301 A1 Dec. 16, 2010

(51) Int. Cl.
*H04B 1/04* (2006.01)
(52) U.S. Cl. .................. 455/127.2; 455/234.1; 455/323
(58) Field of Classification Search .................. 455/118, 455/119, 127.1, 127.2, 230, 232.1, 234.1, 455/240.1, 250.1, 313, 323, 334, 341
See application file for complete search history.

(56) References Cited

U.S. PATENT DOCUMENTS

| | | | |
|---|---|---|---|
| 6,493,326 B1 | 12/2002 | Ramachandran | |
| 6,687,514 B1 * | 2/2004 | Dauerer et al. | 455/561 |
| 7,068,974 B1 * | 6/2006 | Linsky et al. | 455/12.1 |
| 7,542,769 B1 * | 6/2009 | Chheda et al. | 455/453 |
| 7,715,871 B2 * | 5/2010 | Duan | 455/553.1 |
| 7,865,159 B2 * | 1/2011 | Dean | 455/226.1 |

* cited by examiner

*Primary Examiner* — Nhan Le
(74) *Attorney, Agent, or Firm* — Thomas|Kayden

(57) ABSTRACT

A communication apparatus is provided. A power amplifier is coupled to an antenna and switched on or off according to a control signal. A baseband processing module is coupled to the power amplifier and a radio transceiver module, receives a bit stream comprising information indicating corresponding transmitting time and sub-carrier frequencies of up-link messages via the radio transceiver module, processes the bit stream to obtain a map profiling allocations of the up-link messages, prepares the up-link messages to be transmitted according to the map, and generates the control signal according to the map. Within a data frame period, when there is no up-link message to be transmitted during a up-link time interval, the power amplifier is switched off in response to the control signal during the up-link time interval.

15 Claims, 4 Drawing Sheets

METHODS FOR HANDLING A TRANSMITTING PROCESS AND COMMUNICATION APPARATUSES UTILIZING THE SAME

BACKGROUND OF THE INV

1. Field of the Invention

The invention relates to a method for handling a transmitting process of a communication apparatus, and more particularly to a method for handling a transmitting process with reduced power consumption.

2. Description of the Related Art

Orthogonal frequency division multiplexing (OFDM) is an efficient modulation scheme for signal transmission over frequency-selective channels. In OFDM, a wide bandwidth is divided into multiple narrow-band subcarriers, which are arranged to be orthogonal with each other. The signals modulated on the subcarriers are transmitted in parallel.

One way to use OFDM to support multiple access for multiple subscribers is through time division multiple access (TDMA), in which each subscriber uses all the subcarriers within its assigned time slots. Orthogonal frequency division multiple access (OFDMA) is another method for multiple access, using the basic format of OFDM but OFDMA supports multiple subscribers simultaneously use different sub-carriers.

In recent years, OFDMA has been widely used in various communication networks, for example, a Worldwide Interoperability for Microwave Access (WiMAX) network, a Long Term Evolution (LTE) network . . . etc. In order to reduce power consumption to save battery power of communication apparatuses in an OFDMA compatible network, a method for more efficiently handling a transmitting process is highly required.

BRIEF SUMMARY OF THE INVENTION

Communication apparatuses and methods for handling a transmitting process of a communication apparatus are provided. An embodiment of a communication apparatus comprises a power amplifier, a radio transceiver module and a baseband processing module. The power amplifier is coupled to an antenna and switched on or off according to a control signal. The baseband processing module is coupled to the power amplifier and a radio transceiver module, receives a bit stream comprising information indicating corresponding transmitting time and sub-carrier frequencies of up-link messages via the radio transceiver module, processes the bit stream to obtain a map profiling allocations of the up-link messages, prepares the up-link messages to be transmitted according to the map, and generates the control signal according to the map, wherein within a data frame period, when there is no up-link message to be transmitted during a up-link time interval, the power amplifier is switched off in response to the control signal during the up-link time interval.

Another embodiment of a communication apparatus comprises a power amplifier, a radio transceiver module, a processor and a baseband module. The power amplifier is coupled to an antenna and switched on or off according to a control signal. The processor receives a bit stream comprising information indicating corresponding transmitting time and sub-carrier frequencies of a plurality of up-link messages via the radio transceiver module, processes the bit stream to obtain a map profiling allocations of the up-link messages, and prepares the up-link messages to be transmitted according to the map. The baseband module is coupled to the processor, the power amplifier and the radio transceiver module, processes the up-link messages and generates the control signal according to the map, wherein within a data frame period, when there is no up-link message to be transmitted during a up-link time interval, the power amplifier is switched off in response to the control signal during the up-link time interval.

An embodiment of a method for handling a transmitting process of a communication apparatus in a communication system is provided. The communication apparatus comprises a power amplifier amplifying a plurality of up-link messages before the up-link messages are transmitted by an antenna. The method comprises receiving a bit stream comprising information indicating corresponding transmitting time and sub-carrier frequencies of the up-link messages; preparing the up-link messages to be transmitted according to the information; generating a control signal to the power amplifier according to the information; and switching on the power amplifier during a first time interval of a data frame and switching off the power amplifier during a second time interval of the data frame according to the control signal, wherein during the second time interval of the data frame, there is no up-link message to be transmitted.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
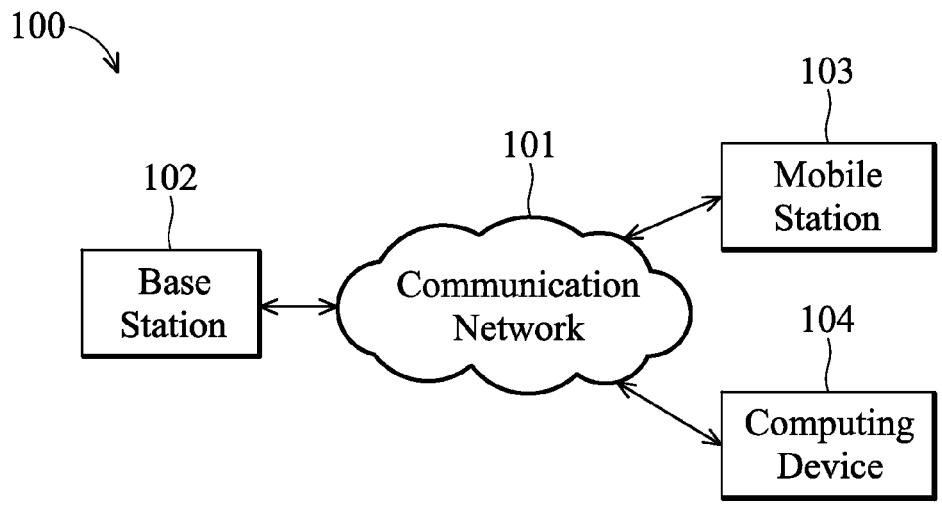
FIG. 1 illustrates a communication system according to an embodiment of the invention.

FIG. 1 illustrates a communication system 100 according to an embodiment of the invention. The communication system 100 facilitates communication between various electronic devices by way of processing, transmitting, and/or receiving data frames. The communication system 100 may include a communication network 101 that facilitates communication between two or more nodes 102, 103, 104, and 105. The communication network 101 may be one or more network types, such as a Worldwide Interoperability for Microwave Access (WiMAX) network, a Long Term Evolution (LTE) network, or any network utilizing an OFDMA scheme.

One or more nodes of the communication system 100 may include of a combination of one or more application programs and/or one or more hardware components. For example, application programs may include software modules, firmware modules, sequences of instructions, data structures, and/or another type of structure that executes operation of the present invention. Further, the hardware component may include a Microprocessor Control Unit (MCU), data buses, memory devices, storage units, data processors, control devices, transmitters, receivers, antennas, transceivers, input devices, output devices, network interface devices, and/or another type of component that is apparent to those skilled in the art.

As shown in FIG. 1, the nodes 102, 103, 104, and 105 of communication system 100 may respectively represent a communication apparatus, such as a base station 102, a mobile station 103, and a computing device 104, which may send and/or receive data frames via a communication network 101, and/or may perform various processing operations using the data frames.

Figure 2:
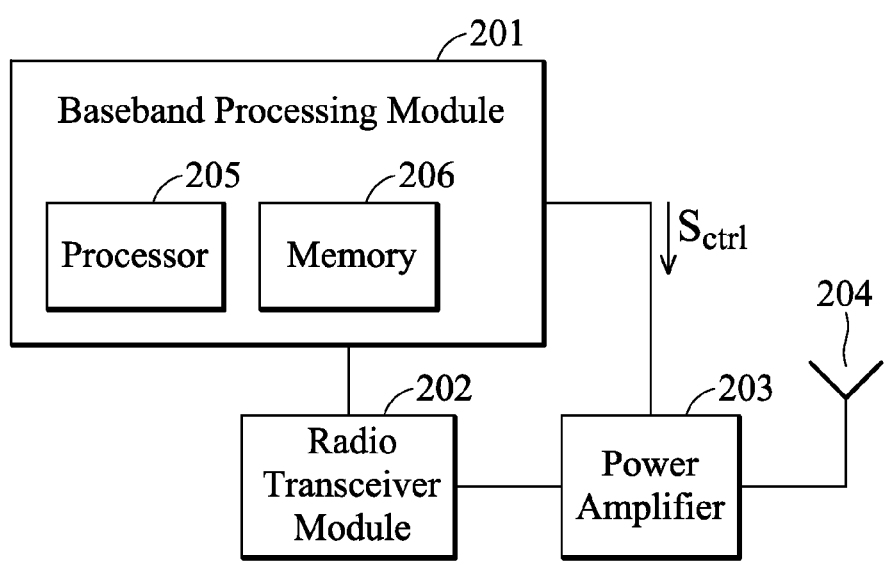
FIG. 2 illustrates a schematic diagram of an exemplary communication apparatus according to an embodiment of the invention.

FIG. 2 illustrates a schematic diagram of an exemplary communication apparatus according to an embodiment of the invention, where the communication apparatus may be the mobile station or the computing device as shown in FIG. 1. The communication apparatus 200 comprises a baseband processing module 201, a radio transceiver module 202, a power amplifier 203 and an antenna 204. The communication apparatus may also selectively comprise a subscriber identity module (SIM) card (not shown). The radio transceiver module 202 receives radio frequency signals, converts the received signals to baseband signals to be processed by the baseband processing module 201, or receives baseband signals from the baseband processing module 201 and converts the received signals to radio frequency signals to be transmitted to another node. The radio transceiver module 202 may comprise a plurality of hardware devices to perform radio frequency conversion. For example, the radio transceiver module 202 may comprise a mixer to multiply the baseband signals with a carrier oscillated in the predetermined sub-carrier frequency of the wireless communication system. The power amplifier 203 amplifies the radio frequency signals of the multiple up-link messages before the up-link messages are transmitted by antenna 204.

The baseband processing module 201 further comprises a processor 205 and a memory 206. The baseband processing module 201 converts the baseband signals to a plurality of digital signals, and processes the digital signals, and vice versa. The baseband processing module 201 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The memory 206 may store the software/firmware code or instructions to maintain operation of the communication apparatus 200. It is to be noted that the memory device 206 may also be configured outside of the baseband processing module 201 and the invention should not be limited thereto. The processor 205 executes code or the instructions stored in the memory 206 and controls the operations of the baseband processing module 201, the radio transceiver module 202, and the power amplifier 203, respectively.

According to an embodiment of the invention, the baseband processing module 201 receives data frames from base station(s) via the antenna 204 and the radio transceiver module 202. The data frames may be received in a form of a plurality of bit streams. The data frames may comprise a plurality of information from the base station. For example, the data frames may comprise information indicating corresponding transmitting time and sub-carrier frequencies of a plurality of up-link (UL) messages and down-link (DL) messages. After being processed by the radio transceiver module 202, the baseband processing module 201 further processes the data frames to acquire the system configurations of the base station and read out resource allocation of down-link and up-link transmissions.

Figure 3A:
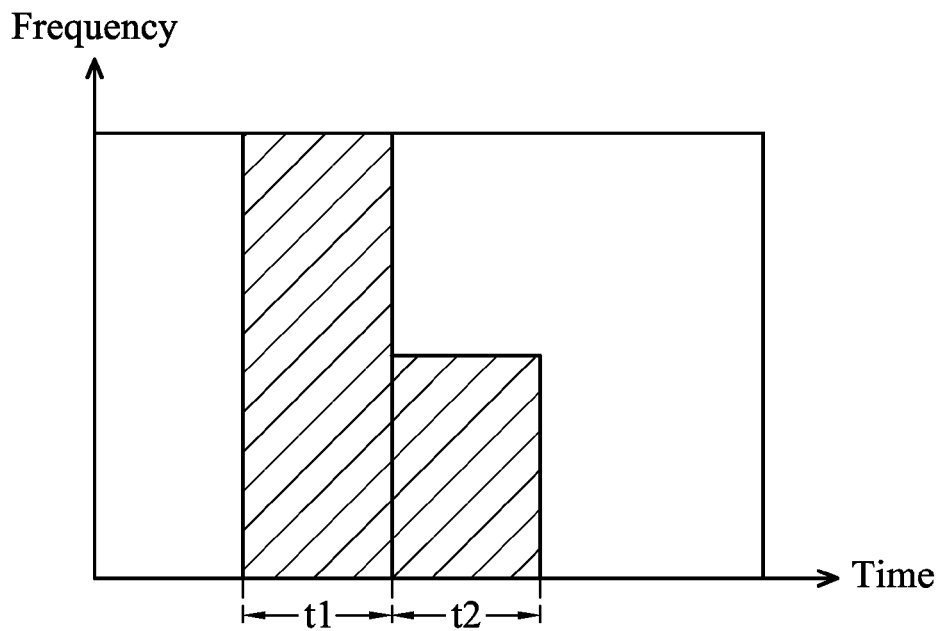
FIG. 3a and FIG. 3b illustrate a schematic diagram of an exemplary up-link map of a communication apparatus according to an embodiment of the invention.
Figure 3B:
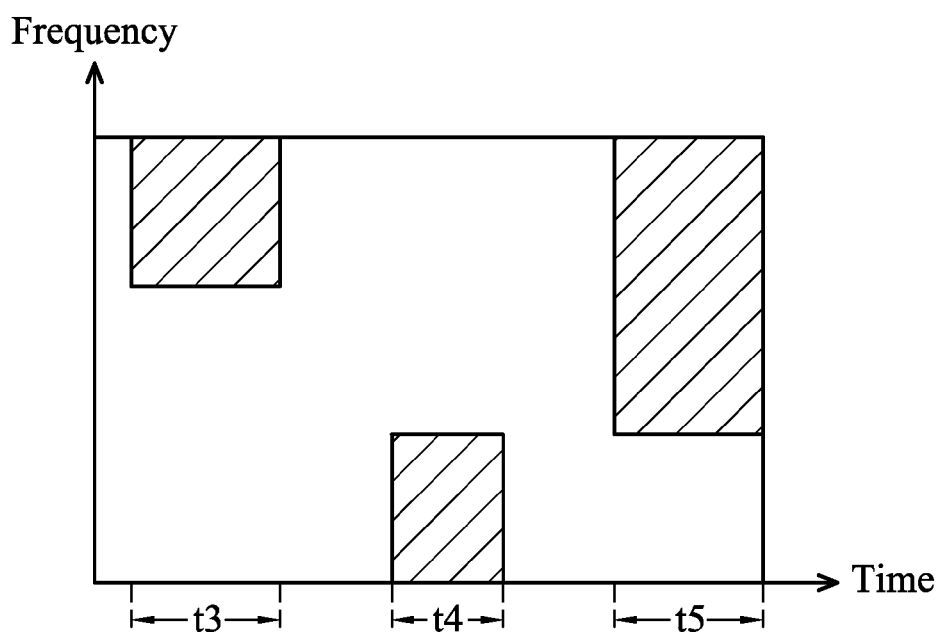

According to an embodiment of the invention, the baseband processing module 201 may generate an up-link map and/or a down-link map, which profiles resource allocations of the up-link/down-link messages. For example, the baseband processing module is able to generate a map to represent which symbol can be utilized to transmit up-link messages. FIG. 3a and FIG. 3b respectively illustrate a schematic diagram of an exemplary up-link map of the communication apparatus 200 according to an embodiment of the invention. As shown in FIG. 3a, the communication apparatus 200 is allowed to transmit the up-link messages to the base station during the time intervals t1 and t2 in the up-link period of a data frame. There is at least one symbol in each of time intervals t1 and t2. The corresponding sub-carrier frequencies for transmitting the up-link messages may also be obtained according to the map. FIG. 3b shows another up-link map according to an embodiment of the invention. As shown in FIG. 3b, the communication apparatus 200 is allowed to transmit the up-link messages to the base station during the time intervals t3, t4 and t5 in the up-link period of a data frame. It should be noted that in this example, the up-link time intervals for the communication apparatus 200 are discontinuous, wherein the channel resource in the blank regions are reserved for other nodes in the communication system.

Since for a communication system that utilizes a multiple access scheme which allows scheduling more than one node to transmit the up-link message at the same time within the same data frame period, such as the Orthogonal Frequency Division Multiple Access (OFDMA) scheme, the up-link time intervals for one communication apparatus may be discontinuous. Thus, instead of switching on the power amplifier 203 all the time during the up-link period of a data frame, the on and off time of the power amplifier 203 may be flexibly controlled according to an embodiment of the invention.

According to an embodiment of the invention, after the baseband processing module 201 obtains the up-link map, the baseband processing module 201 further prepares the up-link messages to be transmitted and generates a control signal $S_{ctrl}$ according to the up-link map. The power amplifier 203 receives the control signal $S_{ctrl}$ from the baseband processing module 201 and is switched on or off according to the control signals $S_{ctrl}$. According to the embodiment of the invention, within a data frame period, when there is no up-link message to be transmitted during a up-link time interval, the power amplifier is switched off in response to the control signal $S_{ctrl}$ during the up-link time interval for saving the power.

Figure 4:
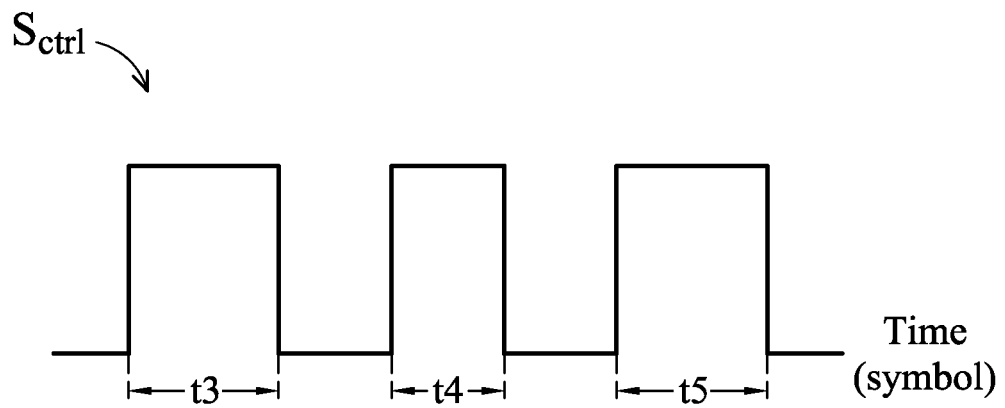
FIG. 4 illustrates a waveform of the control signal according to an embodiment of the invention.

FIG. 4 illustrates a waveform of the control signal $S_{ctrl}$ according to an embodiment of the invention. Reference may be made to FIG. 3b. As shown in FIG. 4, the control signal $S_{ctrl}$ is at a high level during the time interval t3, t4 and t5 so as to switch on the power amplifier 203. In other words, the power amplifier 203 is switched off for the rest of time. In this manner, power consumption is reduced and the battery power is thus saved. It is noted that according to the embodiment of the invention, the corresponding time interval for controlling the power amplifier to be on or off is based on one symbol unit, as an example, an OFDMA symbol. It is also noted that the power amplifier 203 may also be off according to a high level of the control signal $S_{ctrl}$.

Figure 5:
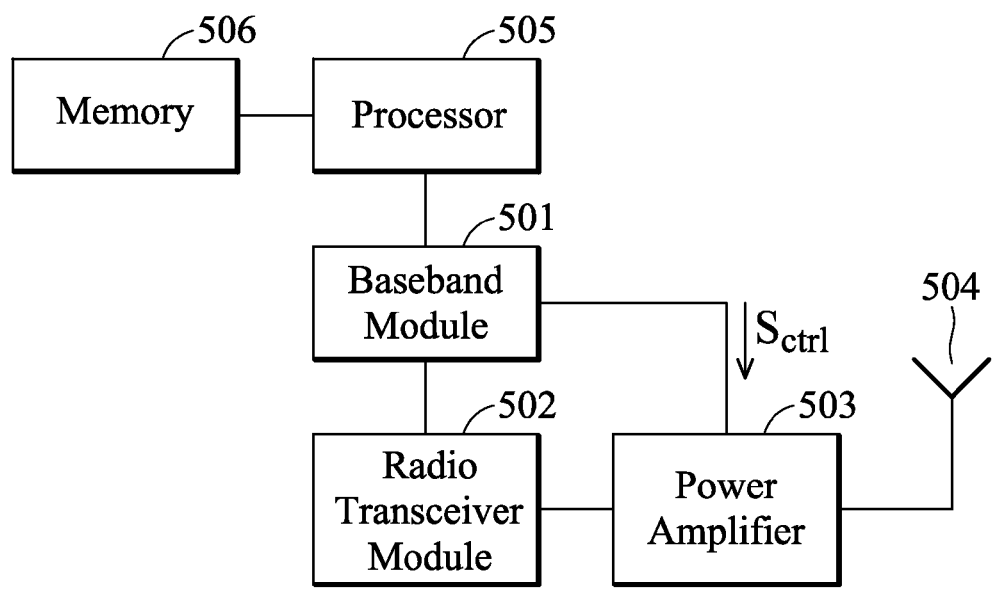
FIG. 5 illustrates a schematic diagram of another exemplary communication apparatus according to another embodiment of the invention.

FIG. 5 illustrates a schematic diagram of another exemplary communication apparatus according to another embodiment of the invention. The communication apparatus 500 comprises a baseband module 501, a radio transceiver module 502, a power amplifier 503, an antenna 504, a processor 505 and a memory 506. The communication apparatus 500 may also selectively comprise a subscriber identity module card (not shown). For description of the main operations of the baseband module 501, the radio transceiver module 502, the power amplifier 503, the antenna 504, the processor 505 and the memory 506, reference may respectively be made to the baseband processing module 201, the radio transceiver module 202, the power amplifier 203, and the antenna 204, the processor 205 and the memory 206 as previously described, and thus are omitted here for brevity. However, it is noted that in this embodiment, the processor 505 and memory 506 are external devices of the baseband module 501. The baseband module 501 in the embodiment of the invention can be hardware non-programmable module for performing a predetermined function according to the commands issued by the processor 505.

According to the embodiment of the invention, the processor 505 receives data frames from base station(s) via the antenna 504, the radio transceiver module 502 and the baseband module 501. The data frames may be received in a form of a plurality of bit streams. The bit streams may be down converted by the radio transceiver module 502, and processed by the baseband module 501 as discussed above. The data frames may comprise a plurality of information from the base station. For example, the data frames may comprise information indicating corresponding transmitting time and sub-carrier frequencies of a plurality of up-link messages and down-link messages. The processor 505 may acquire the system configurations of the base station and read out resource allocation of down-link and up-link transmissions by processing the data frames, and may further generate an up-link map and/or a down-link map, which profiles resource allocations of the up-link/down-link messages. Further, the processor 505 may decide whether the communication apparatus 500 has to transmit the up-link messages required by the base station, and generate the up-link map accordingly.

As an example, for an up-link case, the processor 505 may prepare the up-link messages to be transmitted according to the up-link map, and direct the baseband module 501 to transmit the corresponding up-link messages at the corresponding time by using the corresponding sub-carrier frequencies. The baseband module 501 would then process the up-link messages according to the direction from the processor 505. According to the embodiment of the invention, the baseband module 501 further generates the control signal $S_{ctrl}$ according to the up-link map so as to control the on and off time of the power amplifier 503 based on one symbol unit. As an example, for the OFDMA scheme, the baseband module 501 controls the on and off time of the power amplifier 503 based on one OFDMA symbol unit. Reference may be made to FIG. 4. In this manner, within an OFDMA data frame period, when there is no up-link message to be transmitted during a up-link time interval, the power amplifier 503 is switched off in response to the control signal $S_{ctrl}$ during the up-link time interval.

Figure 6:
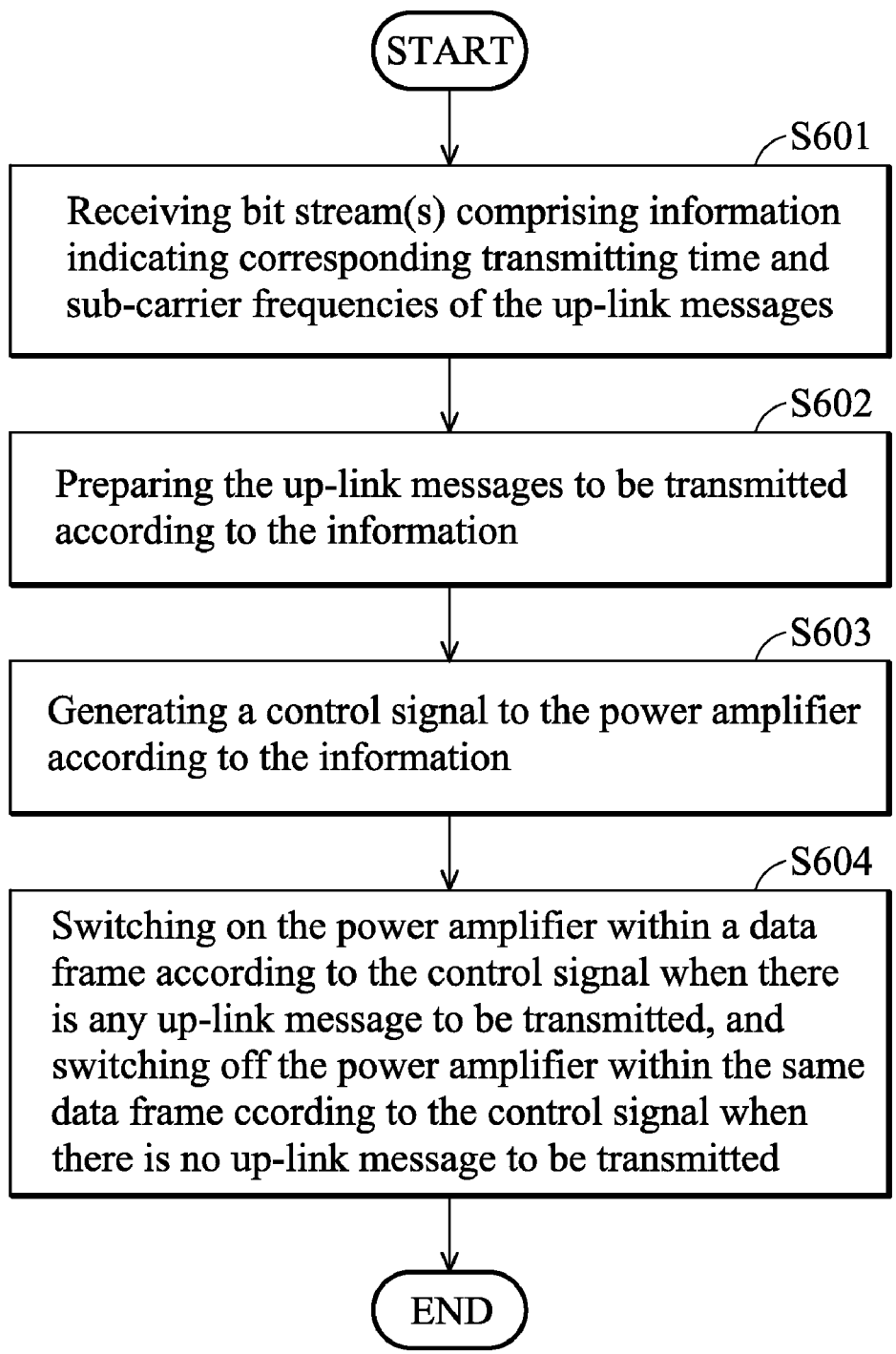
FIG. 6 illustrates a flow chart of a method for handling a transmitting process of a communication apparatus in a communication system according to an embodiment of the invention.

FIG. 6 illustrates a flow chart of a method for handling a transmitting process of a communication apparatus in a communication system according to an embodiment of the invention, wherein the communication system utilizes a multiple access scheme that allows a base station to schedule more than one node to transmit the up-link message in one data frame. As an example, the multiple access scheme utilized by the communication system may be the Orthogonal Frequency Division Multiple Access (OFDMA) scheme. As shown in FIG. 6, firstly, bit streams comprising information indicating corresponding transmitting time and sub-carrier frequencies of the up-link messages are received by the communication apparatus (Step S601). Next, the up-link messages to be transmitted are prepared by the processor according to the information (Step S602). Next, a control signal for the power amplifier is generated by the baseband module or baseband processing module according to the information (Step S603). Finally, the power amplifier is switched on within one data frame according to the control signal when there is an up-link message to be transmitted, and is switched off within the same data frame according to the control signal when there is no up-link message to be transmitted (Step S604). According to an embodiment of the invention, the control signal indicates the on or off time of the power amplifier based on one symbol unit. As an example, the control signal indicates the on or off time of the power amplifier based on one OFDM symbol unit.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus in a communication system, comprising:
 a power amplifier, coupled to an antenna, switching on or off according to a control signal;
 a radio transceiver module; and
 a baseband processing module, coupled to the power amplifier and the radio transceiver module, receiving a bit stream comprising information indicating corresponding transmitting time and sub-carrier frequencies of a plurality of up-link messages via the radio transceiver module, processing the bit stream to obtain a map profiling allocations of the up-link messages, preparing the up-link messages to be transmitted according to the map, and generating the control signal according to the map, wherein within a data frame period, when there is no up-link message to be transmitted during an up-link time interval, the power amplifier is switched off in response to the control signal during the up-link time interval.

2. The communication apparatus as claimed in claim 1, wherein the communication system utilizes a multiple access scheme that allows scheduling more than one node to transmit the up-link message at the same time within the same data frame period.

3. The communication apparatus as claimed in claim 2, wherein the multiple access scheme is an Orthogonal Frequency Division Multiple Access (OFDMA) scheme.

4. The communication apparatus as claimed in claim 1, wherein the corresponding up-link time interval for the power amplifier to be switched on or off is based on one symbol unit.

5. The communication apparatus as claimed in claim 1, wherein the corresponding up-link time interval for the power amplifier to be switched on or off is based on one OFDMA symbol unit.

6. A communication apparatus in a communication system, comprising:
- a power amplifier, coupled to an antenna, switching on or off according to a control signal;
- a radio transceiver module;
- a processor receiving a bit stream comprising information indicating corresponding transmitting time and sub-carrier frequencies of a plurality of up-link messages via the radio transceiver module, processing the bit stream to obtain a map profiling allocations of the up-link messages, and preparing the up-link messages to be transmitted according to the map; and
- a baseband module coupled to the processor, the power amplifier and the radio transceiver module, processing the up-link messages and generating the control signal according to the map, wherein within a data frame period, when there is no up-link message to be transmitted during a up-link time interval, the power amplifier is switched off in response to the control signal during the up-link time interval.

7. The communication apparatus as claimed in claim 6, wherein the communication system utilizes a multiple access scheme that allows scheduling more than one node to transmit the up-link message at the same time within the same data frame period.

8. The communication apparatus as claimed in claim 7, wherein the multiple access scheme is an Orthogonal Frequency Division Multiple Access (OFDMA) scheme.

9. The communication apparatus as claimed in claim 6, wherein the corresponding up-link time interval for the power amplifier to be switched on or off is based on one symbol unit.

10. The communication apparatus as claimed in claim 6, wherein the corresponding up-link time interval for the power amplifier to be switched on or off is based on one OFDMA symbol unit.

11. A method for handling a transmitting process of a communication apparatus in a communication system, wherein the communication apparatus comprises a power amplifier amplifying a plurality of up-link messages before the up-link messages are transmitted by an antenna, comprising:
- receiving a bit stream comprising information indicating corresponding transmitting time and sub-carrier frequencies of the up-link messages;
- preparing the up-link messages to be transmitted according to the information;
- generating a control signal to the power amplifier according to the information; and
- wherein the control signal indicates switching on the power amplifier during a first time interval of a data frame and switching off the power amplifier during a second time interval of the data frame, wherein during the second time interval of the data frame, there is no up-link message to be transmitted.

12. The method as claimed in claim 11, wherein the communication system utilizes a multiple access scheme that allows scheduling more than one node to transmit the up-link message at the same time in one data frame.

13. The method as claimed in claim 12, wherein the multiple access scheme is the Orthogonal Frequency Division Multiple Access (OFDMA) scheme, and wherein the data frame is an OFDMA data frame.

14. The method as claimed in claim 11, wherein the control signal indicating the on or off time of the power amplifier based on one symbol unit.

15. The method as claimed in claim 11, wherein the control signal indicating the on or off time of the power amplifier based on one OFDM symbol unit.

* * * * *